US012668751B1

(12) United States Patent
Li et al.

(10) Patent No.: US 12,668,751 B1
(45) Date of Patent: Jun. 30, 2026

(54) METHOD FOR PREPARING UNREFINED SAF INTERMEDIATE USING POLYOLS AND THE SAF INTERMEDIATE PREPARED THEREBY

(71) Applicant: SHANDONG JIANZHU UNIVERSITY, Jinan (CN)

(72) Inventors: Hui Li, Jinan (CN); Hengdi Li, Jinan (CN); Xiaoling Ma, Jinan (CN); Guowei Liu, Jinan (CN); Rongren Liu, Jinan (CN); Guoning Li, Jinan (CN); Bingwa Nzondelelo, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 0 days.

(21) Appl. No.: 19/334,840

(22) Filed: Sep. 20, 2025

(30) Foreign Application Priority Data

Jul. 29, 2025 (CN) .......................... 202511044879.4

(51) Int. Cl.
*C10L 1/02* (2006.01)
*B01J 31/16* (2006.01)

(52) U.S. Cl.
CPC ............. *C10L 1/02* (2013.01); *B01J 31/1691* (2013.01); *B01J 2231/005* (2013.01); *B01J 2531/0208* (2013.01); *B01J 2531/16* (2013.01); *B01J 2531/847* (2013.01); *C10L 2270/04* (2013.01)

(58) Field of Classification Search
CPC .............. B01J 31/1691; B01J 2231/005; B01J 2531/0208; B01J 2531/16; B01J 2531/847; C10L 1/02; C10L 2270/04
See application file for complete search history.

(56) References Cited

U.S. PATENT DOCUMENTS

2012/0144733 A1* 6/2012 Truitt ........................ C10L 1/02
44/447
2025/0084331 A1 3/2025 Webster-Gardiner et al.

FOREIGN PATENT DOCUMENTS

| CN | 106544375 A | 3/2017 |
| CN | 112979436 A | 6/2021 |
| CN | 119034813 A | 11/2024 |
| CN | 119930571 A | 5/2025 |
| CN | 120041234 A | 5/2025 |

* cited by examiner

*Primary Examiner* — Vishal V Vasisth
(74) *Attorney, Agent, or Firm* — SZDC Law PC

(57) ABSTRACT

A method for preparing unrefined sustainable aviation fuel (SAF) includes: adding a catalyst to a reaction kettle, then adding a polyol solution to fill the reaction kettle; sealing the reaction kettle, introducing gas into the reaction kettle to discharge excess polyol solution and replace the atmosphere in the reaction kettle; stirring thoroughly to mix the catalyst uniformly with the polyol solution; then continuing to introduce gas into the reaction kettle to increase the internal pressure; subsequently conducting the reaction, and after the reaction is completed, collecting the upper liquid product to obtain unrefined SAF. The invention employs a one-pot method to prepare unrefined SAF, utilizing the interaction between polyols and solvents to provide $H_2$ for the system, thereby achieving carbon chain growth and hydrodeoxygenation without the need for high-pressure $H_2$. The synthesis protocol demonstrates operational simplicity, employs mild reaction conditions, and utilizes commercially accessible feedstock with favorable cost-efficiency profiles.

5 Claims, No Drawings

1

METHOD FOR PREPARING UNREFINED SAF INTERMEDIATE USING POLYOLS AND THE SAF INTERMEDIATE PREPARED THEREBY

This application claims priority to Chinese Patent Application No. 202511044879.4, filed on Jul. 29, 2025, which is incorporated by reference for all purposes as if fully set forth herein.

TECHNICAL FIELD

The invention belongs to the technical field of aviation fuel synthesis, and specifically relates to a method for preparing unrefined SAF intermediate using polyols and the SAF intermediate prepared thereby.

BACKGROUND TECHNOLOGY

With the rapid development of the global aviation transportation industry and its heavy reliance on traditional fossil fuels, the aviation sector has become one of the major contributors to greenhouse gas emissions, and this trend continues to escalate. Carbon emissions from the aviation industry in 2023 increased by approximately 140 million tons compared to 2022 levels. According to projections by the International Civil Aviation Organization (ICAO), aviation-related emissions could account for up to 25% of the global carbon budget by 2050 if no effective mitigation measures are implemented, highlighting the urgency of transitioning to a low-carbon economy. To address this challenge, institutions such as the International Air Transport Association (IATA) have published the Comparative Report on Pathways to Net-Zero Carbon Transition in the Aviation Industry, which identifies the development of Sustainable Aviation Fuel (SAF) as a core pathway for achieving significant emission reductions in the sector.

Current SAF production technologies all face limitations that hinder their industrial-scale application. For instance, the hydro-processed Esters and Fatty Acids (HEFA) process, due to its demanding operating conditions (300-450° C., 4-13.5 MPa hydrogen pressure), not only leads to a surge in hydrogen consumption but also significantly increases equipment safety risks and operational costs. The Fischer-Tropsch (FT) process relies on the pyrolysis gasification of biomass or coal at high temperatures of 1000-1500° C. to produce syngas. However, this process faces challenges such as low energy conversion efficiency (<40%) and high costs of high-temperature-resistant reactor materials. The Alcohol-to-Jet (AtJ) process involves sequential reaction steps requiring distinct catalysts optimized for each stage. For instance, acidic zeolites (e.g., H-ZSM-5) are utilized in alcohol dehydration to olefins, while metal catalysts (e.g., Ni or Pt) are employed in subsequent hydro-processing to yield jet fuel-range hydrocarbons, and the separation and purification of intermediates are complex, resulting in high overall energy loss. The Power-to-Liquid (PtL) route's core water electrolysis for hydrogen production faces dual constraints: traditional electrolyzers consume 4.5-5.5 kWh/Nm$^3$ $H_2$, while renewable-powered electrolysis struggles with grid volatility, making continuous production difficult. These analyses demonstrate that current SAF technologies are constrained by suboptimal thermodynamic efficiency and prohibitively high operational costs. Consequently, developing novel conversion pathways—operating under mild conditions (low temperature/pressure), minimizing hydrogen demand, and streamlining process steps—has emerged as a pivotal research priority to address existing bottlenecks.

Currently, polyols are produced in vast quantities annually. For example, glycerol, a byproduct of biodiesel production, exceeds 4 million tons per year, while sorbitol, a co-product of starch hydrolysis and microbial fermentation in biorefining, reaches an annual output of millions of tons. However, most industrial-grade polyols cannot directly enter high-value-added supply chains due to issues like mixtures of homologs and isomers and aqueous-phase impurities. The hydroxyl group density (2.5-4.5 mmol/g) and carbon-to-oxygen ratio (C/O=1.0-3.0) in such mixed systems align well with the dual requirements of deoxygenation and carbon chain extension in SAF synthesis. By designing multi-active-site catalyst systems to enable targeted deoxygenation-coupling cascade reactions for polyol waste streams, it may be possible to break away from traditional SAF processes' reliance on high-purity feedstocks and establish a new 'waste-to-fuel' low-carbon conversion model.

SUMMARY OF THE INVENTION

The present invention provides a method for preparing unrefined SAF using polyols, comprising the following steps:

The catalyst is first introduced into the reactor, followed by filling the reactor with a polyol solution. After sealing the reactor, gas is injected to purge excess polyol solution and replace the internal atmosphere. The mixture is then thoroughly agitated to ensure homogeneous dispersion of the catalyst within the solution. Subsequently, additional gas is supplied to increase the reactor pressure, initiating the reaction. Upon completion of the reaction, the upper liquid phase is collected as unrefined SAF.

In the above preparation method, the catalyst is selected from monometallic or bimetallic MOF catalyst.

In the aforementioned preparation method, the polyol is selected from one or more of glycerol, ethylene glycol, sorbitol, mannitol, and xylitol; the solvent for the polyol solution is selected from one of water, ethanol, and methanol, wherein the mass ratio of polyol to solvent is selected from (3-10):(0-5); preferably 7:3.

In the above preparation method, the gas is selected from one of helium, nitrogen, and carbon dioxide.

In the aforementioned preparation method, the mass-to-volume ratio of the catalyst to the polyol solution is selected from (1-5):(20-50) (g/mL), with a preferred ratio of 3.5:50.

In the above preparation method, the stirring conditions include a rotational speed of 400-1000 rpm for 20-120 minutes, with the reaction temperature maintained at 20-30° C.

In the aforementioned preparation method, the reactor pressure is maintained within the range of 0.5-1 MPa.

In the above preparation method, the reaction conditions are selected from: reacting at 160-300° c and 200-1000 r/min for 3-20 h.

In the present invention, the monometallic MOF catalyst is prepared by the following steps:

Mix the metal salt solution with the ligand solution, stir thoroughly, and perform a hydrothermal reaction. Wash and dry the product, then calcine it to obtain monometallic MOF catalyst.

In the aforementioned preparation method of the monometallic MOF catalyst, the metal salt is selected from salts of transition metals, including Mn, Cr, Fe, Co, Ni, Cu, and Zn. The metal salt solution is an aqueous solution with a mass concentration ranging from 0.1 wt. % to 20 wt. %.

In the preparation method of the monometallic MOF catalyst mentioned above, the ligand is selected from the following: trimesic acid, terephthalic acid, 2,5-furandicarboxylic acid, formic acid, acetic acid, 1,2,4,5-benzenetetracarboxylic acid, 2-aminoterephthalic acid, 2,5-dihydroxyterephthalic acid. The ligand solution is an ethanol solution with a mass concentration ranging from 0.1 wt. % to 10 wt. %.

In the preparation method of the monometallic MOF catalyst mentioned above, the hydrothermal reaction conditions are as follows: 100-120° C. for 20-28 hours, with a preferred condition of 110° C. for 24 hours.

In the preparation method of the monometallic MOF catalyst mentioned above, the calcination conditions are as follows: heating at 300-800° C. for 30-90 minutes; preferably 400° C. for 60 minutes.

In the present invention, the bimetallic MOF catalyst is prepared by the following method:

Add the monometallic MOF catalyst to the metal salt solution and allow them to react, yielding a metal-doped MOF precursor. Subsequently, wash and dry the precursor, then calcine it under controlled conditions to obtain the bimetallic MOF catalyst.

In the preparation method of the aforementioned bimetallic MOF catalyst, two distinct transition metal salts (e.g., combinations of Cr, Mn, Fe, Co, Ni, Cu, or Zn) are selected, and the metals chosen must differ from the metal species present in the corresponding monometallic MOF catalyst. The metal salt solution refers to dimethylformamide (DMF) solution containing the metal salt(s), with a mass concentration ranging from 0.1% to 5%.

In the preparation method of the bimetallic MOF catalyst mentioned above, the reaction conditions are set as follows: heating at 60-110° C. for 18-28 hours, with the optimal conditions being 90° C. for 24 hours.

In the preparation method of the bimetallic MOF catalyst mentioned above, the calcination conditions are set as follows: heating at 300-800° C. for 30-90 min, with a preferred condition of 700° C. for 60 min.

The present invention provides unrefined SAF prepared by the aforementioned method.

The beneficial effects of the present invention are as follows:

The present invention employs a one-pot method to prepare unrefined SAF. By utilizing the interaction between polyols and solvents to provide $H_2$ for the system, it eliminates the need for high-pressure $H_2$ infusion, enabling carbon chain growth and hydrodeoxygenation. The preparation process is simple; the reaction conditions are mild; and the raw materials are readily available and cost-effective.

The method of the present invention achieves high yields of C6-C16 branched and cyclic compounds. These compounds are suitable for preparing high-density fuels, which enhance both density and volumetric energy density, thereby offering significant industrial potential.

The method provided by the present invention replaces the use of traditional fossil resources to prepare aviation fuel by utilizing polyols extracted from industrial waste liquid as raw materials, thereby achieving the recycling of industrial waste.

EMBODIMENTS

Compared to higher alcohols, glycerol (a triol) demonstrates exceptional selectivity advantages in catalytic conversion, owing to its short carbon chain and trihydroxy configuration. These structural features enable controlled carbon chain growth through targeted inter-hydroxyl dehydration-condensation pathways. Hence, the present invention employs glycerol as a representative polyol to investigate catalytic conversion processes.

In this invention, within the conversion products, the C6-C16 products are all unrefined SAF, including hydrocarbons, ethers, alcohols, ketones, acids, esters, etc. Notably, fuels enriched with branched and cyclic hydrocarbons exhibit higher density and volumetric energy density compared to those dominated by linear hydrocarbons.

In this invention, the main products include 2,5-hexanedione, 2-acetylfuran, 2,4-dimethyl-2-(hydroxymethyl)-1,3-dioxolane, 2-oxooctanoic acid, (allyloxymethyl) oxirane, glycerol formal, 2,6-bis(hydroxymethyl)-1,4-dioxane, ethylene glycol diglycidyl ether, among others.

In the following examples of the invention, the reaction was conducted in a miniature stainless steel reactor (model GKCF-S-0.1, manufactured by Gongyi Yingyu High-Tech Instrument Factory).

In this invention, the yield of C6-C16 products is calculated as the ratio of their mass to the total mass of reactants before the reaction (Yield=[Mass of C6-C16 products/Mass of reactants before reaction]×100%), while the selectivity for branched and cyclic C6-C16 products is defined as their mass proportion relative to the total mass of all reaction products. Additionally, the functional group selectivity distribution is investigated by analyzing variations in functional group composition under different reaction times and temperatures, aiming to elucidate the conversion pathways of functional groups and intermediate processes during glycerol transformation.

In this invention, both oxygenated and non-oxygenated C6-C16 products are classified as unrefined SAF (C6-C16 hydrocarbons, as well as C6-C16 branched and cyclic products, are all classified as unrefined SAF.). The selectivity for branched and cyclic structures within these products serves as a critical performance indicator: higher selectivity correlates with enhanced energy density of the resulting fuel, thereby demonstrating superior performance.

SAF is dominated by hydrocarbons, primarily composed of C6-C16 linear and branched alkanes and cycloalkanes, free of impurities such as sulfur and nitrogen. The proportion of linear alkanes is required to be <10%, that of branched alkanes between 40% and 60%, and that of cycloalkanes between 30% and 50%. The unrefined SAF mainly consists of C6-C16 oxygen-containing compounds (e.g., alcohols, ethers, ketones, acids, esters) and hydrocarbons. To be converted into final sustainable aviation fuel, it requires processes such as hydrogenation and hydrodeoxygenation. Notably, C3-C5 hydrocarbons and compounds like alcohols/ketones/esters do not qualify as SAF due to noncompliance with aviation standards.

The technical route of this invention is as follows:

In this invention, the hydroxyl groups on adjacent carbon atoms of polyols undergo a dehydration reaction to form ketones, which then directly cross-couple with alcohols via the Aldol reaction to construct C—C bonds, synthesizing C6-C16 branched and cyclic compounds containing carbonyl and hydroxyl groups. The polyol conversion process requires $H_2$. To address the characteristic of existing SAF production processes that require high-pressure $H_2$ injection, the system utilizes the interaction between solvents and polyols to provide $H_2$ for polyol conversion. The $H_2$ generated during the reaction first participates in the reaction as free hydrogen (H), and any unreacted hydrogen ultimately escapes as hydrogen gas.

First, the hydroxyl groups on adjacent carbon atoms of polyols undergo a dehydration reaction under the action of a metal catalyst, forming keto-enol tautomers. According to the principles of the Aldol reaction, the hydrogen on the α-carbon of the keto-alcohol exhibits weak acidity due to the electron-withdrawing inductive effect of the carbonyl group. Under the influence of the metal active site, the carbonyl oxygen is protonated, enhancing the polarity of the carbonyl group and further increasing the acidity of the α-hydrogen, leading to the formation of an enol intermediate. The nucleophilic carbon (originally the α-carbon) of the enol intermediate attacks the carbonyl carbon of another molecule, forming a new C—C bond and yielding a β-hydroxy carbonyl compound. The β-hydroxy group and the adjacent α-hydrogen undergo dehydration, generating an α,β-unsaturated carbonyl compound, which is then hydrogenated to produce C6-C16 oxygen-containing compounds with carbonyl and hydroxyl groups.

Additionally, hydrogenation and hydrodeoxygenation reactions are also present in the process. The C6-C16 product molecules generated from the Aldol reaction often contain carbonyl and hydroxyl groups, which require further transformation through hydrogenation and hydrodeoxygenation reactions. $H_2$ adsorbs and dissociates into reactive hydrogen species (H·) on the catalyst surface, while the C—O double bond of carbonyl compounds (R—C(=O)—R') adsorbs onto the catalyst surface, weakening the double bond (electron density shifts toward oxygen, leaving the carbon atom with a positive charge). The addition process occurs in two steps: a hydrogen atom attacks the carbonyl carbon (nucleophilic addition), forming an intermediate (such as an oxyanion or metal-carbonyl complex); the second hydrogen atom attacks the oxygen or combines with the intermediate, ultimately producing an alcohol (R—$CH_2$(—OH)—R'). The resulting alcohols further undergo hydrodeoxygenation to remove the hydroxyl group, converting them into hydrocarbons: the hydroxyl group (—OH) of the alcohol and the C—H bond on the adjacent carbon adsorb onto the metal surface, breaking the C—O bond to generate surface-adsorbed alkyl (—R) and hydroxyl (—OH) groups. Subsequently, the adsorbed hydroxyl group reacts with H· to form water ($H_2O$), while the alkyl group (—R) undergoes hydrogenation to produce alkanes.

In the present invention, the products are collected and detected according to the following protocol:

After the reaction is complete, gas samples are collected in gas bags and analyzed using gas chromatography to determine the composition of gaseous products. The upper liquid products are then collected into centrifuge tubes. After centrifugation and filtration to remove the catalyst, the upper liquid samples are obtained and analyzed using gas chromatography-mass spectrometry to determine their composition and distribution. Finally, the lower liquid products are filtered and collected into sample vials, which are analyzed by gas chromatography for determining their composition.

In the present invention, the lower liquid products are all compounds with carbon numbers≥C16, which do not fall within the unrefined SAF fraction, but serve as precursors of SAF and can be converted into SAF through processes such as cracking and hydrogenation. The gaseous products primarily consist of $CO_2$ and $H_2$, neither of which is part of the unrefined SAF fraction.

In the present invention, the Cu catalyst is synthesized via the following protocol:

Dissolve 14.55 g of copper nitrate trihydrate in 180 mL of deionized water and 6.3 g of trimesic acid in 180 mL of anhydrous ethanol, then stir each solution separately at room temperature for 20 min. Mix the two solutions and stir for 45 min. Perform a hydrothermal reaction on the mixed solution at 110° C. for 24 h. Wash the resulting crystals with excess anhydrous ethanol and deionized water, dry in an oven for 18 h, then dry under vacuum in a vacuum oven for 12 h. Finally, heat the material in a tube furnace at a rate of 5° C./min to 400° C. and calcine for 60 min to obtain the MOF-Cu catalyst.

In the present invention, the Cu—Ni catalyst is synthesized via the following protocol:

Dissolve 6.3 g of $Ni(NO_3)_2 \cdot 6H_2O$ in 100 mL of DMF. Then slowly add 4.5 g of the previously prepared MOF-Cu catalyst. Heat the resulting mixture in an oven at 90° C. for 24 h, and cool to ambient temperature to obtain Ni-doped MOF-Cu. Wash the Ni-doped MOF-Cu five times with DMF, and dry in a vacuum oven at 60° C. Finally, heat the material under $N_2$ flow at a ramping rate of 5° C./min to 700° C., and calcine for 60 min to obtain the Cu—Ni catalyst (MOF-Cu/Ni).

All materials used in this invention, unless otherwise specified, are commercially available. All terms used herein, unless otherwise defined, carry the meanings commonly understood by persons skilled in the art. The following detailed description, with reference to specific embodiments and data, further explains the invention. The following examples are provided solely to illustrate the invention and shall not be construed as limiting its scope.

EXAMPLE 1

The preparation of unrefined SAF involves the following steps:

Add a glycerol-methanol solution (glycerol:methanol mass ratio=7:3) into the reactor until it is completely filled. Seal the reactor, then simultaneously open the gas inlet valve and liquid discharge valve. Purge the system with helium while draining excess liquid; retain exactly 50 mL of liquid in the reactor to achieve gas atmosphere replacement. After completing the purge, close the liquid discharge valve. Set initial operating parameters under ambient conditions: room temperature (25±2° C.), stirring speed 400 rpm, and mixing time 40 min to ensure homogeneous dispersion of the catalyst in the solution. After mixing, pressurize the reactor with helium to 0.5 MPa. Seal the gas inlet valve and start the reaction with the following conditions: heat the reactor to 220° C., then maintain isothermal at 220° C. for 6 h.

After the reaction, gaseous products and a layered liquid product are collected. The upper phase of the liquid product is analyzed by gas chromatography-mass spectrometry (GC-MS).

The analysis results are as follows:

The yield of C6-C16 products is 91.36%, the selectivity for branched and cyclic C6-C16 products is 84.98%, and the functional group distribution of the products is as follows: hydrocarbons (1.49%), ketones (44.10%), and alcohols (22.38%).

The main products include: 6-oxabicyclo[3.2.1]nonan-7-one,1,3,5-trimethyl-,propanoic acid, 2-methoxy-,methyl ester, 1-propanol,2-methoxy-,2,5-hexanedione, trans-1,10-dimethyl-trans-9-decalinol, 1-hepten-4-ol, etc.

EXAMPLE 2

The difference from Example 1 is that the catalyst used in this example is a Cu—Ni catalyst. Other steps are the same as in Example 1.

After the reaction, gaseous products and a layered liquid product are collected. The upper phase of the liquid product is analyzed by gas chromatography-mass spectrometry (GC-MS).

The analysis results are as follows:

The C6-C16 products are obtained with a yield of 44.67% and 40.17% selectivity for branched/cyclic isomers. The functional group distribution comprises hydrocarbons (19.47%), ketones (1.53%), and alcohols (26.10%).

The main products include: 4-hydroxy-3-methylacetophenone, p-xylene, 2-methylphenol, 4,7-dimethylbenzofuran, mesitylene, etc.

In this Example, although the C6-C16 yield is lower than in Example 1, the hydrocarbon yield reaches 19.47%. These hydrocarbons can be directly utilized as SAF after separation, requiring no further reactions. In Example 1, hydrocarbon selectivity within the C6-C16 fraction was only 1.49%, with the remainder being oxygen-containing compounds. Such products resemble unrefined SAF, but the low hydrocarbon content leads to high separation costs and a diminished hydrocarbon yield. Consequently, the unrefined SAF from Example 1 is not processed through hydrocarbon separation; instead, it requires hydrodeoxygenation before qualifying as sustainable aviation fuel.

EXAMPLE 3

This Example differs from Example 1 in that glycerol and the copper catalyst are directly blended without the use of methanol as a solvent, and the reaction is conducted under a carbon dioxide atmosphere. All other procedural parameters replicate Example 1.

After the reaction, gaseous products and a layered liquid product are collected. The upper phase of the liquid product is analyzed by gas chromatography-mass spectrometry (GC-MS).

The analysis results are as follows:

The liquid product's mass was 1.25 times the initial mass of glycerol. The mass yield of C6-C16 products was 65.78%, with 60.40% selectivity for branched and cyclic isomers. The selectivity for individual functional groups in the products was: hydrocarbons (7.07%), ketones (46.10%), and alcohols (6.97%).

The main products include: 2,5-hexanedione, 2-cyclopenten-1-one,2,3,4-trimethyl-, n-hexane,2-cyclopenten-1-one,3-methyl-,1-propanone,1-cyclohexyl-,2 (3H)-furanone, dihydro-3,5-dimethyl-, cyclopentane, 1-acetyl-1,2-epoxy-, etc.

EXAMPLE 4

This Example differs from Example 1 in that the reaction is conducted under a nitrogen atmosphere. All other procedural parameters replicate Example 1.

After the reaction, gaseous products and a layered liquid product are collected. The upper phase of the liquid product is analyzed by gas chromatography-mass spectrometry (GC-MS).

The analysis results are as follows:

The yield of C6-C16 products was 57.14%. The selectivity for branched and cyclic isomers within the C6-C16 fraction was 53.47%, with 12.98% selectivity for nitrogen-containing compounds. The functional group selectivity distribution was as follows: hydrocarbons (8.31%), ketones (16.49%), and alcohols (29.88%).

The main products include: propanoic acid,2-methoxy-, methyl ester, 2,5-hexanedione,cyclohexanecarboxylic acid, 4-nitrophenyl ester, etc.

The distribution of nitrogen-containing products is shown in Table 1 below:

TABLE 1

| Distribution of nitrogen-containing products | | |
| --- | --- | --- |
| Product Name | Market Price (USD/MT) | Yield(%) |
| 1,3-Diaminopropane | 13,800-20,700 | 2.48 |
| Azetidine | 273,973-410,959 | 2.34 |
| 3-Amino-2-cyclohexenone | 206,900-275,900 | 1.53 |
| 1-Aminomaleimide | 138,000-206,900 | 5.23 |
| Emimycin | 1,428,570 | 5.41 |
| 5-hydroxypyrazin-1-one | 206,900-275,900 | 2.76 |

COMPARATIVE EXAMPLE 1

This Example differs from Example 4 in that glycerol is directly blended with the copper catalyst without methanol as a solvent. All other procedural parameters replicate Example 4.

After the reaction, gaseous products and a layered liquid product are collected. The upper phase of the liquid product is analyzed by gas chromatography-mass spectrometry (GC-MS).

The analysis results are as follows:

The yield of C6-C16 products is 54.25%; the selectivity for branched and cyclic isomers within this range is 48.34%. The selectivity distribution among functional groups is as follows: hydrocarbons (6.37%), ketones (36.18%), and alcohols (6.26%).

The main products include: propanoic acid, 2,5-hexanedione, 2-cyclopenten-1-one,2,3,4-trimethyl-, 2 (3H)-furanone,dihydro-5-methyl-, etc.

COMPARATIVE EXAMPLE 2

This Example differs from Example 4 by substituting water for methanol as the solvent. Specifically, an aqueous glycerol solution with a mass ratio of glycerol to water set at 7:3 is fed into the reactor. All other procedural parameters replicate Example 4.

After the reaction, gaseous products and a layered liquid product are collected. The upper phase of the liquid product is analyzed by gas chromatography-mass spectrometry (GC-MS).

The analysis results are as follows:

The yield of C6-C16 products is 89.71%. The selectivity for branched- and cyclic isomers within this range is 80.09%. The functional group selectivity distribution is as follows: hydrocarbons (0.45%), ketones (47.78%), and alcohols (29.38%).

The main products include: 2,5-hexanedione, 2 (3H)-furanone,dihydro-3,5-dimethyl-, 1,3-propanediamine,2,4-dimethylfuran,2-cyclopenten-1-one,2,3,4-trimethyl-, cyclohexanecarboxylic acid,4-nitrophenyl ester, (E)-4-oxohex-2-enal, 2-cyclopenten-1-one,2,3-dimethyl-, etc.

COMPARATIVE EXAMPLE 3

This Example differs from Example 2 in that glycerol is directly mixed with the copper-nickel catalyst, with no methanol solvent introduced. All other procedural parameters replicate Example 2.

After the reaction, gaseous products and a layered liquid product are collected. The upper phase of the liquid product is analyzed by gas chromatography-mass spectrometry (GC-MS).

The analysis results are as follows:

The yield of C6-C16 products is 48.68%. The selectivity toward branched/cyclic C6-C16 isomers is 43.31%. The functional group distribution of the products is as follows: hydrocarbons (7.81%), ketones (10.57%), and alcohols (45.90%).

The main products include: glutaranilic acid, 3-oxetanol, 2,2,3-trimethyl-, 1-(1-methylethoxy) propane, 2-methyl-phenol, 2,5-hexanedione, 2,3-Dimethylcyclopent-2-en-1-one, etc.

Based on the experimental Examples, liquid product distributions indicate that polyols (represented by glycerol) undergo controlled conversion through a multi-step reaction pathway.

The cascade reaction mechanism proceeds as follows: First, adjacent hydroxyl groups in polyol molecules are β-dehydrated at metal active sites, yielding α,β-unsaturated ketone intermediates. These intermediates then undergo aldol condensation reactions, thereby enabling elongation of carbon chains from C3 precursors to C6-C16 products. In-situ hydrogen sources (derived from dehydration byproducts and solvent-mediated hydrogen generation) drive a two-stage process: primary hydrogenation converts C6-C16 ketones to corresponding alcohols, followed by secondary hydrodeoxygenation, where hydroxyl groups are removed via metal active sites to yield hydrocarbons. Product distribution demonstrates the high efficiency of this pathway, achieving selectivity of 91.36% toward C6-C16 carbon-numbered products, 84.98% for branched/cyclic isomers within this range, and 8.31% total selectivity toward hydrocarbons. The high selectivity originates from: (1) A synergistic multi-stage reaction mechanism involving acid-catalyzed dehydration, nucleophilic condensation, and hydrodeoxygenation, which enables precise directional conversion of intermediates at catalytically active sites; (2) Continuous generation of in situ hydrogen, effectively eliminating the dependence on high-pressure external hydrogen required by conventional processes.

Examples 1 and 2 demonstrate that catalyst composition dictates product distribution in glycerol-methanol conversion systems. The monometallic catalyst (Cu-MOF) promotes condensation/cyclization pathways, achieving 84.98% selectivity toward C6-C16 branched/cyclic oxygenates. However, due to the inherently low hydrogen activation capacity of Cu and the correspondingly limited hydrodeoxygenation efficiency, hydrocarbon production remains restricted, with merely 1.49% selectivity toward C6-C16 hydrocarbons. Upon incorporating Ni into the Cu-based framework to form a bimetallic catalyst (CuNi-MOF), interfacial electron transfer triggered the reconstruction of active sites, thereby generating a Ni/Cu synergistic interface. This enhancement led to a marked selectivity shift: the selectivity toward branched/cyclic oxygenates dropped to 44.67%, whereas hydrocarbon selectivity rose to 19.47%. Such a redistribution can be attributed to two key effects—the nickel component facilitated β-H elimination, and the bimetallic interface reduced the activation energy for deoxygenation, synergistically promoting C—C bond cleavage.

As demonstrated in Example 3, when the glycerol conversion reaction was conducted in a CO₂ atmosphere over a copper catalyst, the process effectively absorbed CO₂ from the gas phase, achieving carbon reutilization. The selectivity toward C6-C16 hydrocarbons reached 65.78%, with 60.40% of these hydrocarbons exhibiting branched or cyclic structures. Intermediate product distribution analysis revealed ketones as the dominant species (46.10%), followed by hydrocarbons (7.07%) and alcohols (6.97%).

The catalytic reaction data from Example 3 demonstrate that the copper catalyst exhibits significant carbon fixation capability under a CO₂ atmosphere. Thermodynamic analysis reveals that Lewis acid sites on the catalyst polarize the C=O bonds of CO₂ via electron transfer, thereby activating CO₂. The activated CO₂ is embedded into interfacial vacancies in an η2-μ2 (C,O) coordination mode, simultaneously triggering lattice relaxation of metal sites. This synergistic effect reduces the energy level of CO₂'s LUMO, effectively lowering the activation energy barrier for C—O bond cleavage and leading to the conversion of gaseous CO₂ into liquid products. Product distribution characteristics show that C6-C16 hydrocarbons account for 65.78% selectivity, with high-value branched and cyclic structures constituting 60.40% of this fraction; this phenomenon is closely linked to the facet-specific induction by copper of β-H elimination/cyclization pathways. Intermediate product analysis indicates a stepwise deoxygenation mechanism: primary products are dominated by ketones (46.10%), which gradually convert into hydrocarbons (7.07%) and alcohols (6.97%) with extended residence time.

As shown in Example 4, the glycerol conversion products under a nitrogen atmosphere contain 12.98% nitrogen-containing by-products. However, nitrogen-containing compounds in fuels exhibit multifaceted adverse effects on combustion systems: amines and hydrazines decompose to generate NH₃, causing air-fuel ratio imbalance and combustion efficiency fluctuations; NOx pollutants formed during oxidation cause thermal efficiency losses; coke deposits from high-temperature polymerization reactions impair fuel atomization performance. Consequently, international standards, ASTM D7566 and EN 15950, mandate that sustainable aviation fuels maintain total nitrogen content below 10 ppm. To meet this requirement, nitrogen-containing compounds must be separated via acid-base extraction and distillation. Analysis reveals that these nitrogen-containing products include high-value-added chemicals such as Azetidine, Aminomaleimide, 3-Amino-2-cyclohexene, Emimycin and 5-Hydroxypyridazine1-oxide. These compounds can be repurposed as pharmaceutical intermediates, specialty polymer monomers, and other high-value products, thereby improving the economic viability of the overall process.

From Example 1 and Example 4, it can be seen that the reaction atmosphere has a regulatory effect on the carbon number distribution and structural characteristics of the products. When the reaction atmosphere was switched from nitrogen to helium, the selectivity of C6-C16 products increased from 57.14% to 91.36%, and the branched/cyclic C6-C16 products increased from 53.47% to 84.98%. This improvement stems from two synergistic factors: On one hand, helium, with its low molecular weight and reduced mass transfer resistance, enhances the mass transport of low-carbon intermediates (such as C3-C5) and surface C—C coupling reactions, thereby promoting the targeted enrichment of the desired carbon chain (C6-C16) as well as branching and cyclization. On the other hand, nitrogen-containing compounds were identified in the nitrogen atmosphere, whereas such byproducts were not observed in the helium system. It is speculated that nitrogen molecules may competitively occupy catalyst active sites at high temperatures, reducing the binding rate of reactants to the active sites and consequently lowering the selectivity of the main products.

From Example 4, Comparative Examples 1-2, and Example 2 versus Comparative Example 3, the solvent-mediated catalytic system directly modulates the carbon number distribution and structural characteristics of the products. Under solvent-free conditions (Comparative Example 1), the total selectivity toward C6-C16 hydrocarbons reached 54.25 wt. %, of which 48.34 wt. % corresponded to branched/cyclic isomers. Upon introducing methanol as the solvent (Example 4), these values increased to 57.14 wt. % (C6-C16 total) and 53.47 wt. % (branched/cyclic fraction), respectively, alongside a rise in hydrocarbon selectivity from 6.37% to 8.31%. The selectivity enhancement arises from the solvent's dual hydrogen supply pathways: glycerol self-dehydration and methanol-assisted water reforming, which synergistically enhance hydrogen availability compared to the solvent-free system. Gas chromatography confirmed that hydrogen evolution efficiency followed methanol system>solvent-free system, consistent with the observed selectivity trends.

The unrefined SAF prepared by the above method is subjected to sequential extraction, distillation, and separation to yield purified sustainable aviation fuel. The processing steps are as follows:

Separate the upper liquid product:

Mix the liquid product with water in a 1:3 volume ratio (by volume), then add n-hexane in a 1:1 volume ratio relative to the original liquid product. Shake the mixture vigorously for phase separation, yielding two distinct layers. Introduce a solubilizer (β-cyclodextrin or Tween-80) at 5-10 wt. % of the total mixture. This promotes the formation of inclusion complexes or micelles that encapsulate hydrophobic components, thereby minimizing the co-dissolution of oxygenated compounds (alcohols, ketones, esters) in the n-hexane phase. The encapsulated oxygenated compounds preferentially partition into the aqueous phase (lower layer), whereas non-polar hydrocarbons remain in the n-hexane phase (upper organic layer).

The distillation method was utilized to separate hydrocarbons of varying carbon numbers in the n-hexane phase. Initially, C3-C5 hydrocarbons were collected via atmospheric distillation at ≤36° C. Subsequent separation of n-hexane was achieved by maintaining the temperature at 69° C. for 30 minutes. Further heating to 170° C. allowed isolation of C7-C10 hydrocarbons, with a boiling point range of 69-170° C. Finally, vacuum distillation (e.g., using a short-path molecular distillation apparatus) was applied to separate hydrocarbons>C10 under reduced pressure, with an operating temperature range of 196-345° C.

For the separation of alcohols, ketones, or esters in the aqueous phase using a β-cyclodextrin system: The aqueous phase containing β-cyclodextrin is mixed with cyclohexane and ultrasonicated for 30 minutes. After gravitational settling for phase separation, short-chain (C5-C8) compounds are encapsulated in the aqueous phase, while long-chain (>C9) compounds partition into the cyclohexane phase. The two phases are then isolated by centrifugation. In the Tween-80 micellar system, an aqueous solution containing 10% Tween-80 is prepared and mixed with cyclohexane at a 1:1 volume ratio. The temperature is progressively increased (25° C.→40° C.→60° C.) to thermally destabilize the micelles. At 40° C., C5-C10 alcohols, ketones, and esters migrate into the cyclohexane phase, while C11-C12 analogues are released at 60° C. The cyclohexane phase is collected at each temperature interval to achieve carbon-number-based fractionation. Subsequent distillation removes cyclohexane and C3-C4 compounds at 80-85° C., followed by separation of C5-C7 compounds through controlled heating to 100-180° C. The boiling point elevation per additional carbon atom approximates 20-25° C. under atmospheric conditions.

The residual liquid phase comprises predominantly long-chain hydrocarbons (C≥16). Since these compounds fall outside the carbon range specification for unrefined SAF, they are bypassed in the separation unit operations.

The above descriptions illustrate preferred embodiments of the present invention but shall not be construed as limiting the invention to these particular forms. A person skilled in the art may modify or adapt the disclosed technical content to produce equivalent embodiments. Any such modifications, variations, or adaptations deriving from the inventive concept, while remaining within the scope of the present technical solution, will nonetheless fall under the protection defined by this invention.

The invention claimed is:

1. A method for preparing unrefined Sustainable Aviation Fuel (SAF) using polyols, comprising the following steps:
   adding a catalyst to a reaction kettle, then adding a polyol solution to fill the reaction kettle; sealing the reaction kettle, introducing a gas into the reaction kettle to discharge excess polyol solution and replace the atmosphere in the reaction kettle; stirring thoroughly to mix the catalyst uniformly with the polyol solution; then continuing to introduce the gas into the reaction kettle to increase an internal pressure; subsequently conducting a reaction, and after the reaction is completed, collecting an upper liquid product to obtain unrefined SAF;
   wherein the polyol is selected from the group consisting of glycerol, ethylene glycol, sorbitol, mannitol and xylitol; a solvent of the polyol solution is selected from the group consisting of water, ethanol and methanol, wherein the mass ratio of the polyol to the solvent is selected from (3-10):(0-5);
   wherein the gas is selected from the group consisting of helium, nitrogen, and carbon dioxide;
   wherein the catalyst is selected from the group consisting of a monometallic metal-organic frameworks (MOF) catalyst and a bimetallic MOF catalyst;
   wherein the monometallic MOF catalyst is synthesized through a sequential protocol: the metal A salt solution is mixed with the ligand solution, stirred thoroughly, and subjected to a hydrothermal reaction; the resulting product is then washed, dried, and calcined to obtain monometallic MOF catalyst; and the metal salt in the mentioned metal salt solution A is selected from the group consisting of the salts of Mn, Cr, Fe, Co, Ni, Cu, and Zn;
   wherein the bimetallic MOF catalyst is synthesized through a sequential protocol: the monometallic MOF catalyst is added to metal salt solution B and allowed to react, yielding a metal-doped monometallic MOF catalyst; the doped catalyst is then washed, dried, and calcined to obtain a bimetallic MOF catalyst; the metal salt in the described metal salt solution B is selected from salts of Mn, Cr, Fe, Co, Ni, Cu, or Zn, wherein the metal used in the metal salt solution B differs from the metal species in the monometallic MOF catalyst; and
   wherein the unrefined SAF comprises 2,5-hexanedione, 2-acetylfuran, 2,4-dimethyl-2-(hydroxymethyl)-1,3-dioxolane, 2-oxooctanoic acid, (allyloxymethyl) oxirane, glycerol formal, 2,6-bis(hydroxymethyl)-1,4-dioxane, and ethylene glycol diglycidyl ether.

2. The method for preparing unrefined SAF using polyols according to claim 1, the mass-to-volume ratio of the catalyst to the polyol solution is selected from (1-5):(20-50), g:mL.

3. The method for preparing unrefined SAF using polyols according to claim 1, wherein the stirring conditions are selected as: stirring at 400-1000 r/min for 20-120 min at 20-30° C.; the reaction conditions are selected as: reacting at 200-1000 r/min for 3-20 h at 160-300° C.

4. The method for preparing unrefined SAF using polyols according to claim 1, wherein an autoclave pressure is selected as 0.5-1 MPa.

5. The unrefined SAF prepared by the method for preparing unrefined SAF using polyols according to claim 1, the yield of C6-C16 products in the prepared unrefined SAF is greater than 44.67%.

\* \* \* \* \*